United States Patent [19]

Smith et al.

[11] Patent Number: 4,623,829
[45] Date of Patent: Nov. 18, 1986

[54] DUAL SPEED INDUCTION MOTOR

[75] Inventors: Howard W. Smith, West Carrollton, Ohio; Robert H. Douthart, Burlington, N.C.

[73] Assignee: A. O. Smith Corporation, Milwaukee, Wis.

[21] Appl. No.: 648,024

[22] Filed: Sep. 7, 1984

[51] Int. Cl.[4] .............................................. H02P 1/42
[52] U.S. Cl. ..................................... 318/793; 318/786
[58] Field of Search ............... 318/774, 775, 776, 777, 318/778, 786, 793

[56] References Cited

U.S. PATENT DOCUMENTS

| | | | |
|---|---|---|---|
| 2,564,633 | 8/1951 | Ziegler | 318/775 |
| 2,579,066 | 12/1951 | Codling | 318/775 |
| 4,066,937 | 1/1978 | Pfarrer et al. | 318/775 |
| 4,443,749 | 4/1984 | Douthart et al. | 318/786 |
| 4,467,257 | 8/1984 | Douthart et al. | 318/786 |

Primary Examiner—David Smith, Jr.
Attorney, Agent, or Firm—Andrus, Sceales, Starke & Sawall

[57] ABSTRACT

A multiple speed motor includes first and second speed windings connected to first and second power terminals and a start winding connected to a common power terminal. A Triac connects one speed winding to power and has a gate. Either the first or second power terminal is connected to one side of a power supply and the third or common terminal is connected to the second side of the power supply. The gate is connected to the start winding. A speed responsive switch has first and second contacts connected to first and second power terminals and third connected to a common node the connection between the start winding and the gate. The speed responsive switch has a first position which all contacts are engaged to simultaneously energize the first speed winding and the start winding independent of which of power terminals is connected to the power supply and at a selected speed operates to open all contacts whereby the first and second power terminals are disconnected from each other and from said common connection of the gate and start winding. With power at the first power terminal the first speed winding is energized to establish a first speed mode of operation with power at the second power terminal. The second speed winding is energized to establish a second speed mode.

17 Claims, 5 Drawing Figures

U.S. Patent    Nov. 18, 1986    4,623,829
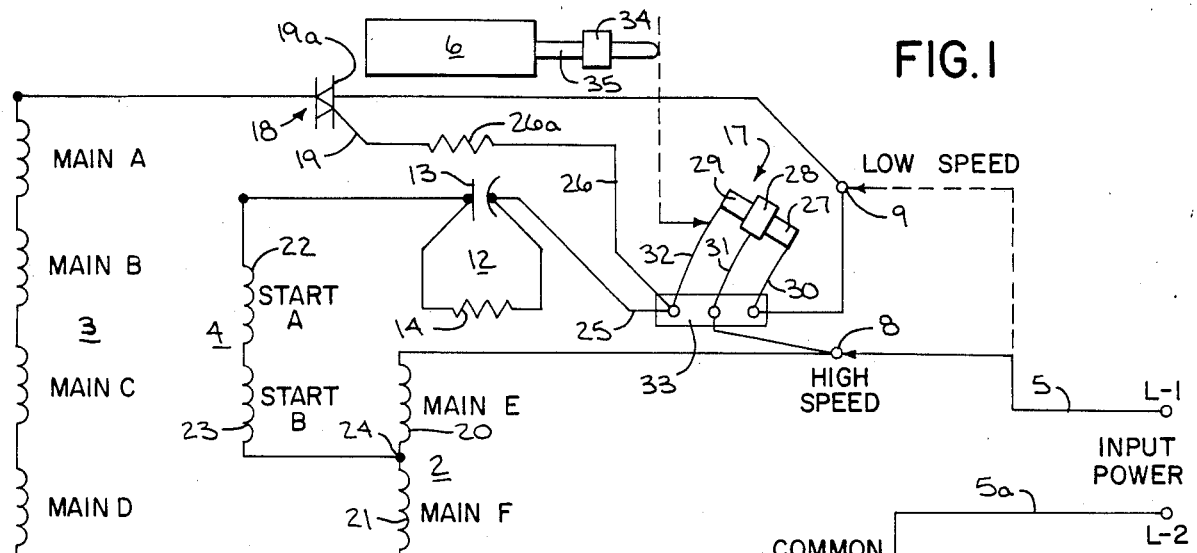
FIG.1
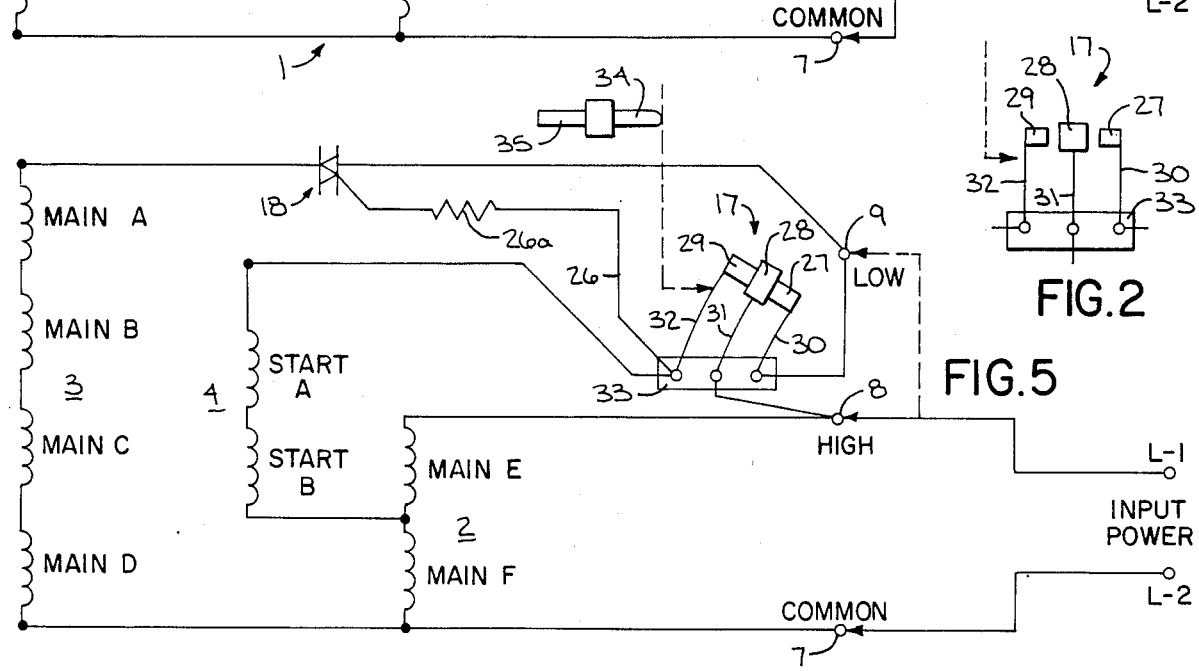
FIG.2
FIG.5
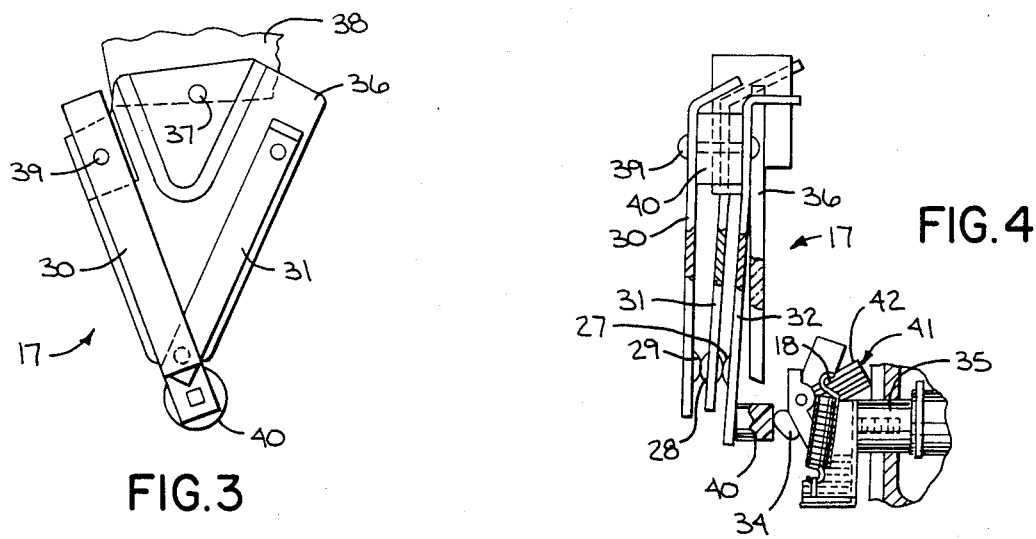
FIG.3
FIG.4

DUAL SPEED INDUCTION MOTOR

BACKGROUND OF THE PRESENT INVENTION

The present invention relates to a dual speed induction motor and particularly to an induction motor having a running winding means and a starting winding means which is disconnected as the motor reaches or approaches operating speed.

The induction motor is widely employed in industrial, institutional and domestic application. Induction motors are constructed with a run winding and a start winding. A switch unit is connected in the circuit of the start winding to disconnect the start winding at a selected speed. Although centrifugal and mechanical switches have been used for many years, solid state switches devices have more recently been provided in place of the centrifugal switch. The inventors have heretofore developed solid state switches for multiple speed induction motors.

Several developments of switch systems for dual speed motors which provided a reliable winding control for a dual speed motor is disclosed in the inventors prior application for patent identified as "CAPACITOR-START INDUCTION MOTOR", Ser. No. 06/433,215, filed Oct. 7, 1982. Other prior switching systems for both signle speed and dual speed motors are disclosed in the discussion of the prior art in the above disclosure as well as in the patents cited in the file wrapper of the above application. Thus, in certain usess, different but constant speeds may be desired. Dual speed induction motors have been suggested in which first and second windings wound with different pole arrangements are selectively connected in circuit with a start winding and a centrifugal switch to permit operation of the motor at different speeds and with a single start winding unit.

The inventors prior disclosures particularly disclose improved AC induction motors having a separate run winding for each speed and a separate start winding with the run windings selectively connected to a plurality of power terminals which in turn are selectively connected to a single phase incoming power supply, and includes a speed-responsive, solid-state start switch means controlling the start winding connection and a second solid state switch means controlling one of the run winding as a switched speed winding. The switched run winding is selectively connected into the circuit and particularly operatively to its power terminal by a solid state gated run switch only in response to a power connection to a related power terminal to effect the second operational or speed mode of the motor. The non-switched run winding is connected either directly to the main supply terminals for the first operational mode and selectively in series with the speed change switch in the second operational mode. The terminology "switched" and "non-switched" is used to differentiate between the two run windings based on the special gated switch which is only present in the circuit of the one run winding to its power terminal. The separate start winding is also connected in circuit in series with a solid state switching means to a common connection or node between the two selection power terminals of the run windings. A centrifugal switch or other motor speed sensitive switch is connected in circuit of the power terminals and start winding to start the motor with the non-switched run winding. Depending upon the incoming power connection, operation of the start switch means changes the power connection to establish operation with power to the appropriate run winding and disconnection of the starting winding from the start circuit and from the power supply. The start switch means is selectively connected into the circuit to control the supplying of power to the start winding, and depending upon the power connection operates to remove the start winding while the main power connection maintains power to the non-switched run winding, or alternatively and simultaneously disconnects the non-switched winding and connects the second switched winding in circuit. In the prior system, a centrifugal or other speed responsive switch is connected in circuit with the two solid state switches to conjointly control the application of power to the two separate run windings and the separate start winding.

SUMMARY OF THE PRESENT INVENTION

The invention is particularly directed on an improved multiple speed induction motor having at least two different run windings and a start winding which is disconnected from circuits at a selected motor speed or state. The motor includes a first speed winding and a second speed winding and a start winding. Three power terminals are provided including a first power terminal connected to the first speed winding and a second speed winding and common power terminal connected to both of said first and second speed windings and to the start winding. The gate run control switch is connected in the connection of the second speed winding to its power terminal. A speed responsive switch means is provided having a position connecting said first and second power terminals to each other and connecting said gated run switch means and said start winding to both said first and second power terminals, and the motor starts with the start winding and one of the run windings connected to receive power regardless of whether power is connected to the first or second power terminal. At selected speeds the switch means changes state and disconnects the first and second power terminals from each other and disconnects the start winding and run switch from the first and second power terminals. The start winding is disconnected, and the run winding which has its power terminal connected to the power supply is energized to operate the motor with only the corresponding run winding energized.

In a preferred embodiment, the run switch means is a gate controlled means having a gate connected in series with a voltage dropping resistor or the like to the start winding. The speed responsive switch means includes a first switch connected between the first and second power terminals and a second switch connecting said common connection of the gate and start winding to both said power terminals. In the first switch position both switches are closed to simultaneously energize the first speed winding and the start winding during an initial start period independent of which of said first and second power terminals are connected to said power supply and at a selected speed both said switches open to selectively connect the first speed winding to establish a first speed mode of operation and the second speed winding to establish a second speed mode of operation, in accordance with which of said first and second power terminals is connected to a power supply.

In a preferred embodiment, a unique centrifugal switch includes three contacts supported by leaf spring arms. The contacts are aligned. The center contact constituting a common contact connected to the power terminal for the one run winding. The first outer contact is connected to the second power terminal and the second outer contact is connected to the common connection of the gate of the gated switch and the start winding. A centrifugal actuator is coupled to one of the outer contacts and with the motor at less than switching speed positively deflects the leaf spring arms to hold all three contacts engaged. As the motor approaches or reaches the desired switching speed, the actuator moves to release the leaf spring arms and the arms move to separate the contacts and open the several circuit connections. The motor thus always starts with the same run winding energized and when the switch opens, the run winding energized is controlled by which of the power terminals is connected to the power supply.

The present invention thus provides a simpler but reliable means using a single available solid state switch and a special speed responsive switch for connecting a start winding to one run winding for starting and then selectively connecting one of two run windings into the circuit for creating a dual speed motor.

DESCRIPTION OF THE DRAWING FIGURES

The drawing furnished herewith illustrates a preferred construction of the present invention in which the above advantages and features are clearly disclosed as well as others which will be readily understood from the following description.

In the drawing:

FIG. 1 is a schematic illustration of a dual speed motor having a capacitor-start circuit for connecting a two-pole run winding or a four-pole run winding in circuit with the a two-pole run mode of motor operation shown in full line illustration and the four pole mode shown in phantom:

FIG. 2 is a view of the alternate position of the switch in response to the reaching of switching speed;

FIG. 3 is a plan view of a switch unit for the circuit of FIG. 1;

FIG. 4 is a side elevational view of FIG. 3 with parts broken away and sectional; and FIG. 5 is a view simmilar to FIG. 1 showing a split-phase induction motor with an embodiment of the invention permitting either a two-pole run mode or a four-pole run mode.

DESCRIPTION OF THE ILLUSTRATED EMBODIMENT

Referring to the drawings and particularly to FIG. 1, a multiple speed A.C. induction motor is schematically illustrated. The A.C. induction motor shown is a single-phase capacitor start motor adapted to operate as a two-pole or four-pole motor and thus at two selected speeds. Any other suitable combination of operating poles may be used by appropriate winding construction. In the illustrated embodiment, the motor stator 1 includes a two-pole run winding 2 and a four-pole run winding 3 which are connected in a motor circuit with a start winding 4. A set of single phase power supply lines 5 and 5a is selectively connected to supply power to the windings 2-4. A rotor 6 is coupled to the stator 1 and operates to produce a motor output based upon the energization of windings 2-4. The windings 2-4 are connected to power lines 5-5a by separate terminals power connection means including a common power terminal 7, a two-pole run power terminal 8 and a four-pole run power terminal 9. In FIG. 1, power supply terminal 7 is connected as the common supply to line 5a for all three windings 2-4 inclusive. The two-pole power terminal 8 and the four-pole power terminal 9 are selectively connected to the power line 5 as shown in full line and phantom line illustration respectively in FIG. 1 for operating of the motor as a two-pole motor or a four-pole motor. Thus, only one of the power terminals 8 and 9 is connected to the supply power line 5, depending upon the desired motor operating mode. Although shown as a direct connection, suitable switching means can of course be provided for connection of the incoming power lines to the motor terminals.

In both circuit connections power is also supplied to the start winding 4 which is connected in circuit to both terminals 8 and 9. The circuit for the start winding 4 includes a series-connected capacitor unit 12 including a start capacitor 13 is parallel with a bleeder resistor 14. The resistor 14 in a preferred embodiment has a wattage rating of ten (10) watts or less and a resistance of at least substantially 5,000 ohms and no more than substantially 50,000 ohms, with the range including the normal tolerances for bleeder resistor. In accordance with the teaching of this invention, the start winding circuit 4 is connected in circuit to power terminals 8 and 9 by a special centrifugal start switch means, a preferred embodiment of which is diagrammatically shown as switch unit 17.

The two-pole winding 2 is connected as a non-switched winding directly to its power terminal 8. The winding 2 is thus provided with power directly from terminal 8. The four-pole winding 3 is connected as a switched winding to the four-pole power terminal 9 in series with a solid state gated switch 18 having a gate 19 for turning the switch on. The solid state switch 18 is normally open holds the circuit to winding 3 de-energized or open. The switch 18 is turned on and four-pole run winding 3 powered, as described hereinafter, only when the power terminal 9 is connected to the power supply line 5, and then after operation of switch 17. Thus, the gate 19 of switch 18 is connected in circuit through the special centrifugal start switch 17.

Generally, special switch 17 is a multiple contact switch connected to simultaneously connect the two power terminals 8 and 9 to the start winding and to the gate 19 of run switch 18. The connection is such that gate 19 is held at the potential of the main terminal 19a of switch 18 to prevent turn-on of switch 18 with the start winding in circuit. The initial connection of motor power always supplies power to the two-pole winding 2, and through the centrifugal switch 17 to the start winding 4 such that the motor always starts as a two-pole wound motor. This power connection is maintained even when the power line 5 is connected to the four-pole input terminal 9 as a result of the connection of the centrifugal switch 17 directly to terminal 8 and 9 and the normal open switch 18.

Before a detailed description of the system, the operation is summarized as follows. With the line 5 connected to terminal 8, the motor starts as a two-pole motor. When the centrifugal switch 17 opens, power is removed from the starting winding 4 and the motor continues to run in the two-pole motor mode. When power line 5 is connected to terminal 9, as shown in phantom in FIG. 1, the motor again starts as a two-pole motor. Gate 19 is held at the potential of line 5 and is held off. At the selected speed, the centrifugal switch 17 switches to remove power from the two-pole run winding 1 and from start winding 4. Switch 17 simultaneously supplies a turn-on signal to the gate 19 of the solid state switch 18 which turns on and supplies power to the four-pole winding 3. The motor now runs as in the four-pole winding.

More particularly, the two-pole winding 2, as shown in FIGS. 1 and 5, includes a pair of series-connecting windings 20 and 21 connected directly between the power terminal 7 and the two-pole power terminal 8. The start winding 4 is a two-pole winding including windings 22 and 23 which are wound in the conventional manner and angularly offset with respect to the run windings 20 and 21. The start winding 4 is shown connected to common power terminal 7 between a common connection 24 of the windings 20 and 21 of run winding 2. The opposite side of start winding 4 is connected in series with the start capacitor 13 and to the centrifugal switch 17.

The illustrated speed responsive switch 17 is a duplex switch interconnecting the speed selection power contacts or terminals to each other and to the start winding circuit lead 25 and the gate lead 26 of the four-pole run switch 18 at a common connection node shown in FIG. 1 at the end of the one side of switch 17. In particular in the illustrated embodiment of the invention, the switch unit 17 is shown as a centrifugally activated switch. The switch has three leaf-spring mounted contacts 27, 28 and 29. One contact 28 is connected to the two pole power terminal 8 and is located between the first and third contacts 27 and 29. The first contact 27 is connected to four pole power terminal 9. The third contact 29 is connected in common to the gate lead 26 of the run switch 18 and to the power lead 25 of the start winding 4. The several contacts 27-29 are diagrammatically illustrated in FIGS. 1 and 2 and each is similarly mounted to the one end of a separate leaf spring 30, 31 and 32, respectively. The opposite end of each leaf spring is fixed to a suitable insulating support 33 and connected to the respective terminals and leads. An actuator 34 is coupled to the motor shaft 35. With the motor stopped or operating below rated speed, the actuator 34 operatively engages and deflects the leaf springs 30-32 in one direction sufficiently far to establish firm electrical engement between the aligned contacts 27-29. Thus the intermediate contact 28 is clamped between the opposite end contacts 27 and 29 by the force of the deflected leaf springs. Thus, at the initial start up of the motor, power is supplied from whichever one of the power terminals 8 or 9 is connected to the incoming power line 5—5a directly to the start winding circuit 4. The same potential is simultaneously applied to the gate 19 of the solid state run switch 18 and to the main power terminal 19a of the gated switch 18 via the four-pole terminal 9. With the gate 19 and the main terminal 19a at a common potential, the run switch 18 is held in an "off" state. The motor thus begins or starts with power always supplied to the start winding 4 and to the two-pole winding 2. The motor accelerates. At a selected speed, the actuator 34 disengages from the leaf spring 30-32 with a snap action. The contacts 27-29 move to the normally open position, shown in FIG. 2, thereby opening the circuit between the power terminals 8 and 9 and simultaneously removing the connection of the power terminals 8 and 9 from the start winding circuit and the gate lead 26. This sequence occurs regardless of which of the terminals 8 or 9 is connected to the incoming power line.

With the power line 5 connected to power terminal 8, power is continued to be supplied to the two-pole winding 2, and only such winding upon the opening of the contacts 27, 28 and 29. The motor thus continues to run as a two-pole motor.

If the power line is connected to terminal 9, the motor starts in the above described mode. Now, upon opening of the centrifugal switch 17 however power is applied from the main power terminal 9 directly to the main terminal 19a of the gated switch. The gate 19 is disconnected from the terminal 9 at switch 17 and assumes a potential based on the connection of the gate lead 26 to and through the start winding 4, and a portion of run winding 2 in the illustrated embodiment, to the common power terminal 7. As a result of the motoring action, a small potential is applied via the above circuit connection to the gate 19. The potential is sufficient to create a turn on current from the gate 19 to the second main termianl 19a of the run switch 18. The switch turns on and power is supplied to the four-pole winding through the gated switch 18. The motor now continues to run as a four pole motor.

The centrifugal switch 17 may of course be of any desired construction having multiple switch means for selectively establishing a controlled connection between the input power terminals, the start winding circuit and the turn-on control circuit of the run switch and particularly providing either the simultaneous interconnection between the several circuits or alternatively simultaneous disconnection thereof.

For example, as shown in FIGS. 3 and 4, a generally triangular shaped support plate 36 is formed of a suitable insulating material has an opening 37 adjacent one side for mounting to a fixed frame member 38 of the motor. The leaf spring contact unit includes the outer leaf springs 30 and 32 secured to the plate 36 by a common rivet 39 with an insulator 40 therebetween to electrically isolate the leaf springs 30-32 and the corresponding contacts 27 and 29. The center leaf spring 31 is secured to the opposite edge of the plate 36. The leaf spring 32 extends below the contacts 27-29 into alignment with the actuator 34 which is moveable axially on the motors shaft 35.

The contact plate 36 is mounted to align the extended tip 40 of the contact arm 32, which has a bearing member secured thereto, with the periphery of the actuator 34.

In the standby position, the actuator 34 engages the tip 40 and deflects the arm 32 and its contact 29 outwardly into engagement with the center aligned contact 28, which deflects said contact 28 and leaf spring arm 31 outwardly to engage the opposite end contact 27 and deflects said contact 27 and its leaf spring arm 30 to thereby provide the circuit connection.

As the motor approaches or reaches the previously described desired switching speed, the actuator 34 retracts with a snap action. The actuator 34 moves from the contact arm extension on tip 40 and the leaf spring members 30-32 return to the normal open position of FIG. 2. This of course corresponds to the alternate circuit condition previously described.

The switch actuator 34 may be of any desired construction. A satisfactory switch actuator for example is shown in U.S. Pat. No. 2,991,340 which issued on July 4, 1961.

The switch actuator 34 includes pivotally mounted weighted governor assembly 41 secured to the rotating actuator 34. At the desired switching speed, a weighed operator 42 moves outwardly causing the actuator 34 to pivot and, in the illustrated embodiment toward the motor. This of course releases the leaf spring contact arms 30-32 and allows the deflected spring arms to move to the normal unstressed position, thereby opening the switch contacts 27-29.

The switching circuit of the present invention although shown in a capacitor start motor is equally applicable to a split phase motor and an appropriate circuit connection is shown in FIG. 5. Corresponding elements are correspondingly numbered in the two embodiments. A comparison of FIGS. 1 and 5 clearly show that the circuits connections are identical, with the exception of the removal of the capacitor 13 and the discharge or bleed resistor 14 which is used in the capacitor motor of FIG. 1. In the split phase motor, as is well known, the arrangement and orientation of the windings are relied on to initiate the starting and acceleration of the motor to the switching speed.

For high speed or two-pole mode of operation, power line 5 is connected to terminal 8 and power line 5a to the common terminal 7. With power applied to lines 5 and 5a, main windings 20 and 21 are energized through the circuit which is traced from terminal 8 through the connecting lead to the main windings 20-21, and return via a connecting lead to terminal 7. Also, the start windings 22 and 23 are energized through the circuit which is traced from terminal 7 through the one half of the run winding 21 to the common node 24, through the start windings 23 and 22 to the start capacitor 13 and via connecting lead 25 to terminal arm 32 on the centrifugally responsive start switch 17 and particularly via switch contact 29, and contact 28 to a split path. The first of the two paths of the split path connects switch contact 28 through leaf spring arm 31 and a connecting lead to the power terminal 8, thereby completing the start winding circuit. The second path of the split path is traced from switch contact 28 to switch contact 27 which is connected via arm 30 and a connecting lead to terminal 9 and continues from terminal 9 through a connecting lead to power terminal 19a of the Triac switch 18, then from terminal 19a to the gate 19 of the Triac switch to a gate resistor 26a, through gate resistor 26a to the terminal arm 32 of 17. The gate 19 and the main terminal 19a of the Triac switch 18 are thus at the same potential, the gate receives no gate current and the Triac switch 18 remains off, causing the four pole windings 3 to be de-energized. The two-pole winding 2 and the start winding 4 are energized. The motor now accelerates in accordance with well known electric motor therory. When the motor shaft speed 35 reaches a predetermined selected switching speed, the governor assembly caused actuator 34 which is engagement with switch arm, to move in such a direction as to disengage and open all contacts 27-29 on the switch, so no electrical connection is made between such contacts. Because of the opening of the switch contacts, the start winding 4 is disconnected from the main power input terminal 8 and thus connected line 5 and thus is deenergized. The motor now runs at high or two pole speed, because the two pole main winding 2 continues to be energized. The four-pole main winding 3 remains de-energized because the main power terminal 9 is now an open circuit, due to the open electrical connection of the switch contacts 27-29 inclusive, and the disconnection of terminal 9 from main power input 5.

For low speed or 4-pole operation, main power line 5 is connected to terminal 9, as shown in phantom in FIG. 1, and the power line 5a is connected to terminal 7.

With power now applied to power lines 5 and 5a, the two pole main winding 2 is again energized through the following circuit: current flows from power terminal 7 through the main windings 21 and 20 to power terminal 8 and from terminal 8 through a connecting lead to the common terminal arm 31 on the speed responsive switch 17, and at contact 28 two different paths are again developed. The first path from terminal 28 continues from the contact 28 to the contact 27 of the switch 17 and then via contact arm 30 and a connecting lead to the main power terminal 9, completing the energizing circuit for the two-pole main run winding 2 to line 5 which is connected to the main power terminal 9, as shown in phantom. The main power terminal 9 is also connected by a lead to the main terminal 19a of the Triac switch 18. The second path from common contact 28 of switch 17 is from the contact 28 to the opposite contact 29 of switch 17 which is connected by an arm 32 and lead 26 to the resistor 26a, the opposite of which is connected by a lead to the gate 19 of the Triac switch 18. The gate 19 and the main power terminal 19a of the Triac switch 18 are at the same potential because they are both connected to terminal 9. The Triac switch 18 receives no gate current and thus it and the main four-pole winding 3 are held in the off or deenergized state. The second connecting lead from the terminal arm 32 of switch 17 also now feeds the two pole start windings 4 to terminal common node 24 and through winding 21 to the main power terminal 7, completing the two pole start winding circuit. The two-pole main winding 2 and the two-pole start wind 4 are energized and the motor will now accelerate as a two-pole motor in accordance with well known electric motor theory. When the accelerating motor shaft 35 reaches a predetermined selected switching speed, the governor assembly causes the actuator 34 which is in contact with the switch arm tip 40, to move in such a direction to release the switch and again disengage and open the switch contacts 27-29 of switch 17 on the switch, so no electrical connection is made between such switch contacts. With the contacts open, the start winding 4 and the main winding 2 are both deenergized.

With start winding and the main winding turned off or deenergized, a potential shift occurs at the common connection between the gate resistor 26a and the start winding 4. Since there is no current flow in the start winding 4 and the main winding 2, the potential of the main power line 7 is shifted to the potential of the terminal arm 32 of the switch, through the connecting lead 26 to the gate resistor 26a, through resistor to the gate 19 of the Triac switch 18. This potential shift causes a gate current to flow from the gate 19 to the main terminal 19a of the Triac switch of 18, connecting lead 26 to the power terminal 9 and thus to power line 5, completing the gate circuit from power line 5a to power line 5. With this gate current circuit established, the Traic switch 18 is on and thus energizes the four-pole main winding 3. The motor now continues to run at the low speed as a four-pole motor.

The present invention thus provides a very simple reliable and effective mechanically actuated switch unit with can be directly and effectively used in both capacitor start motor and the split phase motors without change in the switch structure and only the usual required change in the motor circuit connections and windings. Thus it is particularly adapted to commercial motor implementation.

Various modes of carrying out the invention are contemplated as being within the scope of the following claims, particularly poining out and distinctly claming the subject matter which is regarded as the invention.

We claim:

1. A multiple speed motor comprising a first speed winding means, a second speed winding means, a start winding means, three power terminals including a first power terminal connected to the first speed winding means and a second power terminal connected to the second speed winding means and a common power terminal connected to said first and second speed winding means and start winding means, gated run control switch means for the second of said first and second speed winding means, said run control switch means having a terminal gate for turning said switch means on, a speed responsive switch means having a position connecting said first and second power terminals and connecting said gate of said run control switch means and said start winding means to both said first and second power terminals and at selected speed operable to disconnect said first and second power terminals and to disconnect said start winding means and said gate of said run control switch means from said first and second power terminal.

2. The multiple speed motor of claim 1 wherein said speed responsive switch means is a centrifugal switch having a first contact connected to said first power terminal and a second contact connected to said second power terminal and a third contact connected in common to said start winding means and to said terminal gate of said gated run control switch, a support means supporting said contacts for relative movement between a first position in which said three contacts are in engagement and a second position in which said three contacts are disengaged, and an actuator coupled to the motor and to said contacts to establish said first and second positions in response to the speed of said motor.

3. The motor of claim 2 wherein said gated run control switch means is connected in series with said second speed winding means, a starting capacitor is connected in series with said start winding means between said speed responsive switch means and said common power terminal.

4. The motor of claim 2 wherein said gated run control switch means and said speed responsive switch means are conjointly operable to start the motor with said first speed winding means and said start winding means energized, said speed responsive switch means being responsive to a selected switching speed to open the circuit to said start winding means to operate the motor with power applied to the first power terminal, said gated run control switch means being responsive to operation of said speed responsive switch means to energize only said second speed winding means with power applied to said second power terminal.

5. The motor of claim 1 having a gate circuit including a voltage dropping means connected between said gate and said start winding means to connect the gate to the common power terminal.

6. The motor of claim 5 wherein said voltage dropping means includes a resistor.

7. The motor of claim 5 wherein said speed responsive switch means is a mechanical switch having a first contact connected to said gate and to said start winding means and a second contact connected to said first power terminal and a third contact connected to said second power terminal, and having an operator connected to said motor and operable to hold the contacts engaged below the selected switching speed.

8. The motor of claim 1 wherein said speed response switch means includes said first, second and third contacts, each of said contacts including a support leaf spring mounted in aligned spaced relationship to the other leaf springs, and an actuator coupled to said contacts and movable between a first position to deflect said leaf springs and hold said contacts engaged and a second position to release said leaf springs and hold said contacts disengaged.

9. The motor of claim 1 wherein said run control switch means is a gate controlled Triac means a gate circuit including a voltage dropping means and connected to said gate and the start winding means, said speed responsive switch means being connected to the connection between said voltage dropping means and said start winding means whereby turn-on gate current is supplied to said controlled Triac means only with said speed responsive switch open.

10. The motor of claim 1 wherein said first speed winding means is a two-pole winding means, said start winding being connected to the center of the two-pole winding, said start winding is a two-pole winding, a capacitor connected in series with said start winding means and said second speed winding means is a four-pole winding.

11. A multiple speed motor comprising a first non-switched speed winding having a first number of poles, a second switched speed winding having a different number of poles, a start winding, a common power terminal connected to said first and second speed windings, a first speed terminal connected directly to the first speed winding, a second speed terminal, a solid state gated run switch connecting said second switched speed winding to said second speed terminal and having a gate means for turning said switch on, said first and second speed terminals being adapted to be connected to one side of a power supply with said common terminal connected to the second side of said power supply, a branch circuit connecting said gate means in series with said start winding and having a first common connection node, a speed responsive switch means having a first switch connected between said first and second power terminals and a second switch connecting said common connection node to said first switch means for connecting said common connection node to said first and second speed terminals, said speed responsive switch means having a first position in which both said switches are closed to simultaneously energize said gate means and said first speed winding and said start winding during an initial start period independent of which of said first and second speed terminals are connected to said power supply and at a selected speed operable to open both said switches whereby said first and second speed terminals are disconnected from each other and from said common connection node to selectively connect said first speed winding to establish a first speed of operation and said second speed winding to establish a second speed of operation in accordance with which of said first and second speed terminals is connected to a power supply.

12. The motor of claim 11 wherein said start branch circuit is connected in circuit in series with a part of said first non-switched speed winding.

13. The motor of claim 11 wherein said start winding means is connected to said second power terminal in series with said second switch and is connected to said first power terminal in series with said first switch and said second switch of said speed responsive switch means, said gate means being connected in series with a resistor to said common node.

14. The motor of claim 13 including a start capacitor connected between the start winding and the common node.

15. The motor of claim 14 wherein said first speed winding is a two-pole winding, said start winding being connected to the center of the two-pole winding, said start winding is a two-pole winding, and said second speed winding is a four-pole winding.

16. A multiple speed motor having at least first and second run windings adapted to be connected directly to incoming power lines of differieng voltages, a start winding, a run control switch connected to at least one of said run windings to control energization of said corresponding run winding, said control switch having a control terminal to turn said switch on, and a speed responsive switch means having a plurality of leaf spring switches, and an operator engaging said plurality of leaf spring switches and having a first position and a second position, said operator in said first position holding all of said leaf springs engaged and said switches closed and in said second position holding all of said leaf springs disengaged and said switches open, and said switches being interconnected to connect the control terminal of said control switch and the start winding to the one side of the incoming power lines during start of said motor and to disconnect the control switch and start winding from the one side of the incoming power lines in response to a selected switching speed.

17. The motor of claim 16 having circuit means connecting said start winding and said switch control terminal of said run control switch to each other, first and second power terminals connected to the incoming power lines, and said speed responsive switch means having a first position connecting said first and second power terminals to each other and to said start winding and said switch control terminal and a second position opening said connection of said first and second power terminals and disconnecting said switch control terminal and said start winding from said power terminals.

* * * * *